United States Patent [19]
Holt

[11] Patent Number: 5,223,168
[45] Date of Patent: Jun. 29, 1993

[54] SURFACE CLEANER AND TREATMENT

[76] Inventor: Gary Holt, 11736 S. Dry Creek Rd., Sandy, Utah 84090

[21] Appl. No.: 706,570

[22] Filed: May 28, 1991

Related U.S. Application Data

[63] Continuation of Ser. No. 449,713, Dec. 12, 1989, abandoned.

[51] Int. Cl.$^5$ .............. C11D 7/00; C23G 1/06
[52] U.S. Cl. .................... 252/142; 134/38; 134/39; 134/40; 134/41; 252/153; 252/162; 252/170; 252/171
[58] Field of Search ............. 252/142, 153, 162, 170, 252/171; 134/38, 39, 40, 41

[56] References Cited

U.S. PATENT DOCUMENTS

| | | | |
|---|---|---|---|
| 2,337,062 | 12/1943 | Page | 134/41 |
| 3,925,229 | 12/1975 | Bolsing | 252/142 |
| 4,477,364 | 10/1984 | Sarina | 252/142 |
| 4,541,945 | 9/1985 | Anderson et al. | 252/149 |

Primary Examiner—Paul Lieberman
Assistant Examiner—William S. Parks
Attorney, Agent, or Firm—Mallinckrodt & Mallinckrodt

[57] ABSTRACT

An acid-based cleaner and related methods, for cleaning and treating tile, limestone-based cement and concrete and similar surfaces to maintain a slip-resistant surface, and to harden and strengthen the grout or cement and make it more resistant to penetration by salt or other deterious chemicals. The cleaner comprises an aqueous solution of hydrofluoric acid, phosphoric acid, and a surface active or wetting agent. Also, the invention, upon application to the surface, creates a microbe-free surface as required in hospitals, laboratories, and the like.

14 Claims, 1 Drawing Sheet

SURFACE CLEANER AND TREATMENT

This application is a continuation, of application Ser. No. 07/449,713, filed Dec. 12, 1989, now abandoned.

BACKGROUND OF THE INVENTION

1. Field

The present invention relates generally to the care of floor coverings and more specifically to a cement and tile cleaner, and related methods, which provides a slip resistant surface and effectively prolongs the life of both.

2. State of the Art

Because of its durability and the ease with which it can be cleaned, tile has become an extremely popular floor covering, especially in commercial establishments. Virtually all boards of health require that tile floors in commercial establishments be cleaned daily with a chemical cleaner.

Conventional cleaners used in compliance with board of health regulations come in a variety of different types and the chemical cleaner market has become intensely competitive as a result. Some of the types of cleaners for tile floors known in the art are bleach, all-purpose and/or degreasing detergents, powder cleaners and steam cleaners.

In an effort to minimize slip/fall type accidents, many tile floor owners are concerned about making their floors as slip resistant as possible. New tile is required to have a dynamic coefficient of friction of 0.6 or higher. As the new tile is cleaned with prior art cleaning agents, however, the coefficient of friction decreases. This is due, in main part, to a gradual buildup of residual cleaner which remains after cleaning is completed. Thus, over time the thickness of the buildup increases and the coefficient of friction decreases to a point where the tile becomes unsafe for pedestrian traffic. Furthermore, the residue buildup traps water beneath it in surface cracks, the water being unable to evaporate or otherwise escape. This causes premature deterioration and erosion of the tile, as well as the cement or grout which bonds the tile together.

Over the years, attempts have been made to reduce slip/fall accidents by introducing sand-like substances directly into the tile during the firing process, or into an epoxy-based coating applied to the top of the tile. Some have attached strips of gritty paper to the tile or have covered them with mats. Others have used an initial "etching" process which, while temporarily providing slip resistance, soon returns the tile floor to a worse condition than initially encountered as conventional prior art cleaners are applied. All of these methods are not only ineffective, but difficult to maintain and very expensive as well, requiring numerous reapplications and replacement.

Another popular floor covering with broad based application is cement or concrete. Because cement floors are used extensively in industrial environments, special high strength cleaners are required to effectively clean and sanitize them. For example, many automotive garages have cement or concrete floors. Dirty oil, grease, and other automotive fluids are frequently spilled onto the floor where they combine with dirt and other refuse. Such a combination cannot be removed with conventional prior art cleaners. The cleaners that are powerful enough to remove this combination are usually extremely abrasive and/or corrosive, and thus significantly shorten the useful life of the cement or concrete.

SUMMARY OF THE INVENTION

With the foregoing in mind, an objective of the present invention is to substantially solve the prior art problems of cleaner buildup and slip resistance on tile floors. The invention is an acid based chemical cleaning solution which, because of its acidity, prevents residue buildup on tile floors and at the same time maintains an "etched" or roughened surface to prevent slippage by pedestrians. Further, the same solution reacts with exposed grout between tiles to form a hardened sheen of fluorapatite, which significantly lengthens the useful life of said grout.

Another objective of this invention is to provide a floor cleaner powerful enough to remove from limestone-based concrete floors the most difficult combinations of dirt, oil, grease, etc. Also, as with grout, the solution reacts with limestone-based cements and concretes to form a hardened surface of fluorapatite. Hence, this invention serves to lengthen the useful life of limestone-based concrete floors whereas prior art high strength cleaners corrode and lessen the useful life of same.

Further, an object of the invention is to provide a microbe-free surface. Because of this characteristic, the solution is particularly well-suited for use in hospitals, laboratories, and other locations in which a sterile or near-sterile environment must be maintained.

This invention comprises an aqueous solution of hydrofluoric acid, phosphoric acid, and a wetting agent. The solution attacks the surface of tile on contact because of its hydrofluoric acid content, while the phosphoric acid acts as a buffer. Because of the attack, the surface of the tile becomes fluorinated and slightly roughened (as in etched glass) to make the tile less slippery. Also, since the attack is a surface phenomenon, the strength of the tile is not detectably altered.

The hydrofluoric acid further attacks the surface of cement or other limestone based materials, such as grout between tiles. This reaction forms a surface coating of fluorapatite covering any exposed surface. The fluorapatite is stronger, harder, and less soluble than untreated limestone cements or grout. Also, because of the strong acids contained therein, virtually no microbes remain on a surface after treatment with this solution.

Although both hydrofluoric and phosphoric acids are potentially dangerous, the low concentrations in which they are here utilized render them manageable for everyday use. In its preferred concentration, the phosphoric acid is virtually harmless in normal use and is less than the phosphoric acid concentration in Coca-Cola. The preferred concentration of hydrofluoric acid will not cause harm during intended use if direct and prolonged contact with the skin is avoided and fumes are not inhaled.

THE DRAWINGS

In the accompanying drawing, which represents the best mode presently contemplated for carrying out the invention:

FIG. 1 is a graphical representation of a comparative slip resistance test between the present invention and various prior art cleaning products.

DETAILED DESCRIPTION OF THE ILLUSTRATED EMBODIMENT

Figure 1:
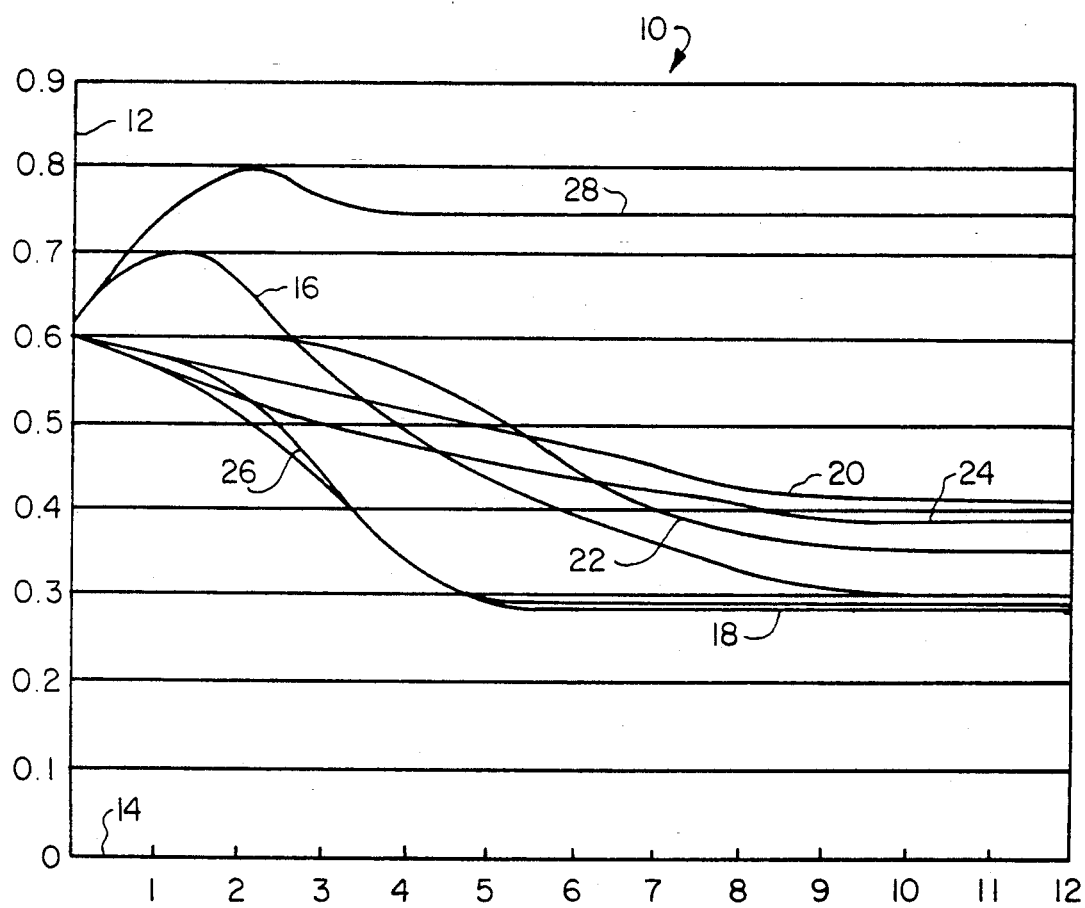

The invention is a surface cleaner comprising an aqueous solution of hydrofluoric acid (HF), phosphoric acid ($H_3PO_4$), and a surface active agent. It has been found that the hydrofluoric acid and phosphoric acid combine to give a particularly effective cleaner which will maintain an etched, slip-resistant surface on tile floors and will actually harden grout and concrete surfaces. The surface active agent acts as a wetting agent to aid the acid in spreading over the surface to be cleaned and penetrating the dirt and grease on the surface to give effective cleaning. For cleaning tile, concrete, or similar surfaces, where it is desired to maintain a slip-resistant surface and to harden the grout on concrete surfaces, the solution is effective with between 0.12 and 2.55% by volume hydrofluoric acid, between 0.07 and 1.46% by volume phosphoric acid, and between 0.01 and 0.37% by volume surface active agent. The remainder of the solution is water.

The best mode presently contemplated for making and using the invention is to prepare a concentrated solution, to then dilute the solution to the strongest usable solution to deliver to the customer. The customer then further dilutes the solution to the needed strength. The preferred initial cleaning solution comprises nine gallons of industrial grade (70%) hydrofluoric acid (HF), four and one half gallons of institutional grade (80%) phosphoric acid ($H_3PO_4$), one gallon of a wetting agent, and forty and one half gallons of water. A preferred wetting agent is called Turgetal MP-9 with a specific gravity of 1.057 at 20° C. and manufactured by Union Carbide Corporation. Turgetal MP-9 in a 9 mole surfactant of nonylphenoxypolyethoxyethanol. The constituent parts are all combined, mixed and then stored preferably in standard fifty five gallon plastic drums. This initial solution is extremely acidic. It has use in this form as an initial floor or surface etcher and high strength cleaner.

The acceptable levels of the parts may vary within a certain range without changing the nature or scope of the invention claimed. The highest acceptable level in that range is ten gallons of industrial grade (70%) HF, five gallons of institutional grade (80%) $H_3PO_4$, one gallon of wetting agent and thirty nine gallons of water. Using a per volume percentage formula, the highest acceptable level is 12.728% HF, 7.273% $H_3PO_4$, 1.818% wetting agent, and 78.182% water. On the other hand, the lowest acceptable level in the range is eight gallons of industrial grade (70%) HF, four gallons of institutional grade (80%) $H_3PO_4$, one-half gallon of wetting agent and thirty nine gallons of water. Using a per volume percentage formula, the lowest acceptable level is 10.182% HF, 5.818% $H_3PO_4$, .909% wetting agent, and 83.091% water.

Once the initial solution has been mixed, as explained, further dilution is made in the ratio of one part initial solution to four parts water to create a twenty percent solution. In this secondary diluted state, the twenty percent solution may be sold commercially as a high strength daily floor cleaner, yet most often requires even further dilution before actual use. This twenty percent solution has a measured pH of approximately 2.4.

The concentration level at which the solution is actually used depends upon a number of factors, the most important of which is the type of surface to be cleaned. Other factors include frequency of cleaning and desired luster. Tile and cement surfaces are the most common to be treated by this invention. The preferred concentration level is determined by covering a small test section of the desired surface with the twenty percent solution diluted in water further to a ratio of one to nine, brushing it into all cracks and rinsing with water. If the surface appears chalky, more water is added to further dilute the solution. If the surface appears and feels slippery, more solution is added to increase the concentration level. This process is then repeated as often as necessary with a newly made solution on fresh test sections of desired surface. The range of concentrations of initial solution at which the invention is most effective is between a one to four ratio (twenty percent solution) and a one to eighty ratio.

After the proper concentration level has been ascertained, the regular cleaning routine may be established. For best results, a commercially available dilution valve is used to obtain the proper concentration from the twenty percent solution. The preferred dilution valve is available from Dema Manufacturing of St. Louis, Mo. This valve is attached to a hot tap water supply as well as to a large vessel filled with the twenty percent solution. Upon opening the valve, the correct measures of water and twenty percent solution are combined to form the desired concentration. Use of this dilution valve provides the advantage of not having to risk direct contact with the HF during manual mixing. Thus, when the valve is opened the twenty percent solution is automatically mixed with a predetermined amount of water and released into a standard cleaning bucket.

The cleaning itself is best accomplished by mopping the predetermined concentration of twenty percent solution in water evenly over the surface to be cleaned, brushing it about with a broom to ensure proper penetration, and then rinsing the solution down the sewer drain. Thus, hands or other exposed body parts need never come in direct contact with the invention.

In using the invention as described, two phenomena occur that make it distinct from other cleaners. The first phenomenon is the reaction of the hydrofluoric acid (HF) in the solution with tile on surfaces to be cleaned. This is best explained by a brief examination of the chemical make-up of tile.

Tile is comprised essentially of clay; the most common type of clay used in tile, pottery and the like, is called Kaolinite. The approximate analytical composition of Kaolinite is $SiO_2$ (40–50%), $Al_2O_3$ (30–40%), and $H_2O$ (10–15%). Since aluminum (Al) and flourine (F) form a stronger bond than Al and oxygen (O), treatment of tile with HF results in replacement of hydroxide (OH) groups attached to Al by F groups. The number of OH groups replaced by F depends on the concentration of the HF solution and the time of treatment. This process opens the underlying silicate structure to attack by HF and a slightly roughened, less slippery surface is generated. Because the attack is a surface reaction only, the strength of the tile is not detectably altered. Phosphoric acid ($H_3PO_4$) in the solution provides extra acid to speed up the process and to control the acid concentration (phosphate buffers).

The second phenomenon which makes the invention distinct from others is the reaction of the solution's $H_3PO_4$ and HF with limestone based cements, e.g. mortar, grout, and concrete. Most mortar for brick or tile is made from burned lime [$Ca(OH)_2$], water ($H_2O$), and sand. The Ca($OH)_2$ loses $H_2O$ on standing to form linkages with the sand and/or tile. As mortar stands in the air, air slaking occurs to convert it into a limestone matrix ($CaCO_3$).

Portland cement, another limestone-based product commonly used to make concrete, also reacts with HF and $H_3PO_4$. It is made by mixing and grinding limestone with a clay or shale material and heating it until it begins to vitrify. This is then mixed with two percent gypsum and ground. Concrete is then made by mixing the portland cement with sand, gravel, and water.

Treatment of limestone-based mortar or cement with phosphoric acid ($H_3PO_4$) causes the formation of phosphates, such as hydroxy apatite [$Ca_5(OH)(PO_4)_3$] on the surface. Hydroxy apatite is a white insoluble solid phosphate with layers of CaOH on surfaces. Similar to Kaolinite, the CaOH linkage can be attacked by HF to give CaF linkages and water. The product is a surface sheen of fluorapatite [$Ca_5F(PO_4)_3$] which is significantly harder and stronger than either the hydroxy apatite or the original limestone. For example, Dana's Manual of Mineralogy gives limestone in its various forms a hardness rating of 3.0 (easily scratched with a knife) whereas fluorapatite is given a hardness rating of 5.0 (scratched by a knife with great difficulty). This reaction is similar in many ways to the action of fluoride on teeth which contain hydroxy apatite.

The invention can also be added to cement or concrete during the mixing phase of preparation. Adding the solution at this stage forms a harder concrete or cement thoughtout rather than merely a hardened surface layer as described above.

Reference is now made to FIG. 1 wherein the results of a comparison test between the present invention and a number of prior art cleaners on tile is reported in the form of a graph 10. The ordinate 12 of graph 10 represents the dynamic or kinetic coefficient of friction of the tile tested while the abscissa 14 represents time in months. Each of the curves 16, 18, 20, 22, 24, 26, and 28 on the graph 10 therefore measures the ability of a certain cleaner to maintain the slip resistance of the tested tile over a twelve month period. As indicated, each cleaner began its test on a sample of the same type of tile with a dynamic coefficient of 0.6. The following table identifies the type of cleaner represented by the various curves 16, 18, 20, 22, 24, 26, and 28:

16: Acid-based cleaners, e.g. Dracket Sure-Trac by Bristol Meyers and Safety Step by Dynamic Research
18: Slip resistance packet cleaners, e.g. Safety-Trac by Kay Chemicals
20: Steam cleaners, e.g. an alkaline-based steam cleaner by Union Carbide
22: Powder cleaners, e.g. industrial strength Tide by Colgate Polmolive
24: All-purpose, e.g. Regain by Eco-Labs, and/or degreasing cleaners, e.g. Recover by DuBois
26: Bleach, e.g. Clorox
28: The present invention The dynamic coefficient of friction is used in this test rather than the static coefficient of friction as the dynamic coefficient is more representative of real life situations (slips do not normally occur while standing still). The Ceramic Tile Institute classifies dynamic coefficients of friction as follows:
0.6–1.0: Slip resistant
0.5–0.6: Conditionally slip resistant
0.3–0.5: Questionable
0.0–0.3: No slip resistance, unsafe As clearly indicated by graph 10, the curve 28 of the present invention is the only curve which does not dip below 0.6, and thus is the only cleaner able to maintain a slip resistant tile surface over a twelve month span.

This test was made using a ten pound block on the bottom of which is fastened a piece of leather of conforming shape and area. Also, approximately three feet of cord is attached at one end to the center of a side panel of the block. The opposite end of the cord is connected to a pull scale or a similar force measuring device. The block is placed on the surface to be tested and the tester grasps the free end of the pull scale. A tension force is then put on the cord and pull scale by the tester in a direction substantially perpendicular to the face of the block to which the cord is attached. The force is increased until the block is traveling at a uniform speed across the tested surface. The force required to pull the block at a uniform speed across the tested surface is measured on the pull scale and divided by ten to yield the dynamic coefficient of friction. By using this test to measure the dynamic coefficient of friction of seven different tile surfaces, each treated with a different tile cleaner, at least once per month over a twelve month time span, the graph of FIG. 1 was generated.

In addition, a standard microbial culture test carried out by the pathology laboratory at Mesa Lutheran Hospital in Mesa, Ariz. indicates that use of the present invention on tile floors virtually eliminates microbes, whereas a conventional tile cleaner has little, if any, effect on microbial colonies. This test was made by taking a sterile cotton swab, rubbing it on an untreated portion of tile floor, and then rubbing the same swab into a standard petry dish. The dish is then filled with an agar solution and placed in an incubator for 48 hours. The same procedure was repeated after treating the test portion of tile floor with the present invention.

The results of this test showed that the sample from the untreated tile floor grew fifteen colonies of microbes in 48 hours, whereas the sample from the tile floor treated with this invention grew no microbes at all in the same time period.

Caution must be exercised to ensure that no glass containers or tools are used or come in contact with the present invention since HF in such a high concentration is extremely corrosive and attacks glass. Other suitable storage vessels besides fifty five gallon plastic drums include bakelite, rubber, and paraffin containers. Also, care must be taken to avoid contact with the skin or eyes of the mixer, as HF in this concentration can cause serious burns. If such burns occur, the key treatment is long and continued washing with water as soon as possible after exposure.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:
1. An acid-containing solution for cleaning tile, cement, and concrete surfaces, said surfaces including hydroxide groups in their chemical make-up and replacing some of said hydroxide groups found in such surfaces with fluoride whereby said fluoride replacement acts to maintain the slip resistance of said surfaces, harden said surfaces, and decrease microbe counts on said surfaces, said solution consisting essentially of:
(a) between about 0.12 and about 2.55% by volume hydrofluoric acid;
(b) between about 0.07 and about 1.46% by volume phosphoric acid;
(c) between about 95.62% and about 99.81% by volume water.

2. An acid based cleaning solution according to claim 1, wherein said surface active agent is nonylphenoxypolyethoxyethanol.

3. A process for cleaning tile, cement, and concrete surfaces, said surfaces including hydroxide groups in their chemical make-up and replacing some of said hydroxide groups found in said surfaces with fluoride, whereby said flouride replacement acts to reduce microbial count, maintain the coefficient of friction on said surfaces, and harden said surfaces, which comprises the step of exposing the surface to a diluted solution consisting essentially of between about 0.12% and about 2.55% by volume hydrofluoric acid, between about 0.07% and about 1.46% by volume phosphoric acid, between about 96.62% and about 99.18% by volume water, and a surface active agent.

4. A process for cleaning and treating tile, coment, and concrete surfaces according to claim 3, wherein said surface active agent is nonylphenoxypolyethoxyethanol.

5. A process for cleaning and treating tile, coment, and concrete surfaces according to claim 3, further comprising the step of rinsing said diluted solution from said surface with water.

6. A process for cleaning and treating tile, coment, and concrete surfaces according to claim 3, further comprising the step of forcing said diluted solution into exposed cracks and apertures.

7. A process for cleaning and treating tile, coment, and concrete surfaces according to claim 3, further comprising the steps of:
(a) forcing said diluted solution into exposed cracks and apertures; and
(b) rinsing said diluted solution from said surface with water.

8. Tile, cement, and concrete surfaces having hydroxide groups in their chemical make-up which have been treated in accordance with the process of claim 3 to replace some of the hydroxide groups with fluoride.

9. A method of preparing a tile, coment, and concrete surface cleaner and treatment, comprising the step of mixing together:
(a) between about 0.12 and 2.55% by volume hydrofluoric acid;
(b) between about 0.07 and 1.46% by volume phosphoric acid;
(c) between about 0.01 and 0.37% by volume surface reactive agent; and
(d) between about 95.62 and 99.81% by volume water.

10. An acid containing solution for treating tile, cement, and concrete surfaces to clean same while maintaining its coefficient of friction, said solution consisting essentially of:
(a) between about 0.12 and about 2.55% by volume hydrofluoric acid;
(b) between about 0.07 and about 1.46% by volume phosphoric acid;
(c) between about 0.01 and about 0.37% by volume surface active agent; and
(d) between about 95.62 and about 99.81% by volume water.

11. An acid containing solution for treating tile, cement, and concrete surfaces according to claim 10 whereby periodic treatments maintain a dynamic coefficient of friction of at least 0.6.

12. An acid containing solution for treating tile, cement, and concrete surfaces according to claim 10 whereby periodic treatments maintain a dynamic coefficient of friction of at least 0.7.

13. An acid containing solution for treating tile, cement, and concrete surfaces to maintain their slip resistance, to clean same, to increase the hardness of same and to decrease microbe counts on same said solution consisting of:
(a) between about 0.12 and about 2.55% by volume hydrofluoric acid;
(b) between about 0.07 and about 1.46% by volume phosphoric acid;
(c) between about 0.01 and about 0.37% by volume surface active agent; and
(d) between about 95.62 and about 99.81% by volume water.

14. A process utilizing an acid containing composition for application to a tile, cement or concrete surface; said composition comprising hydrofluoric acid, phosphoric acid, and a wetting agent; whereby said process comprises applying said composition to said surface to result in at least one of the following:
cleaning said surface of dirt and grease;
maintaining the coefficient of friction of concrete and tile floor surfaces when applied to same;
hardening said tile, cement and concrete surfaces when applied to same; and
decreasing the microbial count of tile and concrete surfaces.

* * * * *